June 11, 1935.  L. A. VON TILL  2,004,230
MEASURING DEVICE
Filed Sept. 19, 1930

INVENTOR
Louis A. Von Till
BY Norman Holland
ATTORNEY

Patented June 11, 1935

2,004,230

UNITED STATES PATENT OFFICE 2,004,230

MEASURING DEVICE

Louis A. Von Till, Brooklyn, N. Y., assignor to Anchor Cap & Closure Corporation, Long Island City, N. Y., a corporation of New York Application September 19, 1930, Serial No. 482,946

13 Claims. (Cl. 33—199)

The present invention relates to measuring devices or gages and more particularly to a device for measuring glass containers.

Screw caps are very desirable for use with glass containers because they may be sealed and resealed repeatedly. A popular type of screw cap is one having lugs formed at the lower edge of the cap adapted to engage interrupted threads on glass containers. Such caps are commonly used on products such as mayonnaise and the like. These caps are more easily applied and removed and form a better seal than ordinary continuous thread caps. One of the difficulties of lug caps is the accuracy required of the cap engaging means or finish on the glass container to assure satisfactory seals on the containers. This is particularly true with reference to accuracy in the distance between the lower side of the thread or projection on the container and the rim of the container. This measurement is usually required to be within, plus or minus, five one-thousandths of an inch. It is, therefore, necessary for the glass mold to be very accurate. If containers are shipped from a glass factory, which do not come within the prescribed tolerances, the packer has difficulty in securing the closure caps to the containers properly. The packer immediately complains both to the glass factory and to the cap manufacturer. Generally, a representative from each visits the packer, in response to the complaint, and endeavors to allocate the fault. Naturally, the representative of the glass company is inclined to place the blame on the cap and the representative of the cap factory is inclined to place the blame on the glass. It, therefore, becomes necessary to measure the glass finish to determine whether or not it is within specifications. Heretofore, micrometers have been used, but even skilled persons obtain different readings with such instruments and misunderstanding results. It frequently happens that the interested party cannot be convinced of his fault, and the packer does not know whether the glass or the cap is offsize.

The present invention aims to overcome the above difficulties by providing means whereby glass factories may readily determine whether or not the ware is within specifications before it is shipped. If improper ware is shipped, the packer can readily discover and allocate the fault between the cap and the glass. These improvements in measuring the ware are obtained by providing an accurate measuring device which anyone can operate and which gives the same results in all cases.

An object of the invention is to provide a device to facilitate measuring the finish on glass containers.

Another object of the invention is to provide a simple device for determining the accuracy of the lugs, screw threads, or other finish on glass containers for engaging closure caps applied thereto.

Another object of the invention is to provide a gage for glass containers which anyone can operate in a minimum of time.

Another object of the invention is to provide an accurate means of determining the measurements of glass finishes.

Another object of the invention is to provide a single gage adapted to determine both the height of the thread and the inclination thereof.

A further object of the invention is to provide a method of determining, with ease, the position of the thread on the container.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein Fig. 1 is a side elevational view of the device, partly in section;

Figure 1:
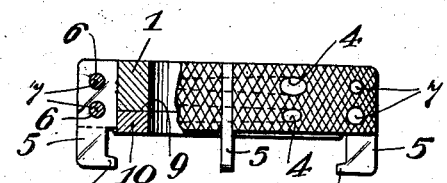
Figure 2:
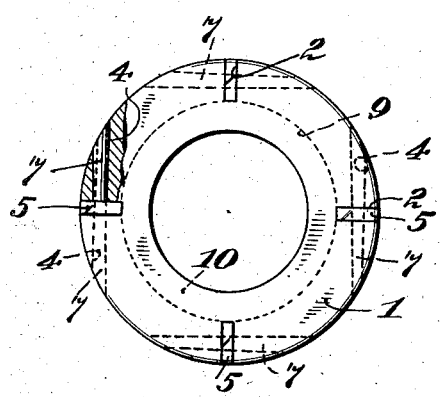
Fig. 2 is a top plan view, partly in section.

Referring again to the drawing illustrating a preferred embodiment of the invention, there is shown a gage, or measuring device, comprising an annular ring 1, preferably made of a relatively soft metal such as brass or bronze, with a series of vertical slots 2 therein. The number of these slots will depend upon the number of lugs or divided threads on the glass container, the most common forms being two, four or six threads.

A pair of conduits or apertures 4 are preferably drilled laterally through the ring to intersect each of the slots 2. Suitable flat members 5 are inserted in the slots, with apertures 6 therein adapted to register with the conduits 4 formed in the annular ring. Suitable pins 7 are driven through the apertures 4 in the metal ring and the apertures 6 in the members 5 to hold the members rigidly in position. Preferably, the conduits 4 are larger at one end than at the other in order to provide a tight fit between the various elements. As shown in the preferred embodiment, the upper and lower conduits have their large ends on the opposite side of the member 5, through which they pass in each instance.

The lower ends of the members 5 have short projections 8 extending from the inner side thereof and shaped substantially to conform to the shape of the lugs on standard caps so that the gage may be applied to the container in the same manner as the caps are applied.

In order to prolong the life and increase the accuracy of the measuring device, the ring 1 is provided with an annular recess 9, at its inner lower periphery, adapted to receive an annular ring 10 made of hard metal, such as steel. It will be understood that the metal ring 10 is adapted to engage the rim of the container and to provide a hard, smooth surface in engagement therewith. The ring 10 may be secured in position in any suitable manner, so that it is substantially integral with the ring 1. The distance between the lower side of ring 10 and the upper side of the lugs or thread engaging means 8, must be accurate. Ordinarily, the tolerances in these projections of the gage are not more than one one-thousandth of an inch.

On the underside of the ring 1 and of the annular ring 10 are a pair of radial lines 11 and 12, adapted to register with a mark on the container to be gaged, so that the mark will fall between these two lines when the threads on the ware are within specifications. When the device is screwed thereon, if the ware is beyond the prescribed specifications, the mark will be beyond these two lines; that is, on one side, if below the minimum, and on the opposite side if above the maximum.

While the present invention has many applications, the embodiment illustrated herein is particularly applicable to divided thread glass containers such as are commonly used for mayonnaise and the like. The container 13 has the usual neck portion provided with a shoulder 14 and a plurality of divided threads 15, here shown as four in number, although any desired number may be used. In containers of this kind, the glass is pressed partly into shape and thereafter placed in a split mold and blown. The mold leaves a mark 16, extending vertically on the container at diametric points thereof.

In some cases, the mold mark on the body of the container is spaced with reference to the mold mark on the neck of the container, the latter being made by the neck ring. In the present embodiment, the two are illustrated as coinciding. The mold mark made by the neck ring preferably passes through the lower end of a thread 15 at the downwardly extending part or projection 17 thereof, forming a stop for the lugs on the cap. In other words, the mold mark on the neck cooperates with the stop formed on the thread for preventing the cap from riding over the lower end of the thread. In addition, the mold mark is always definitely fixed with reference to the thread of the container and, therefore, provides a convenient mark for use with the gage described herein.

Figure 3:
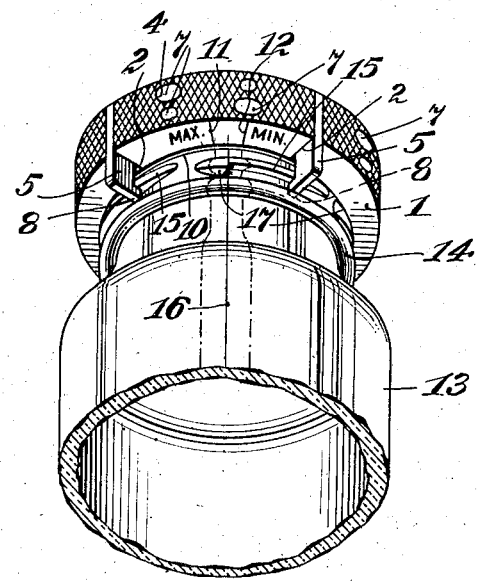
Fig. 3 is a perspective view showing the device applied to a container and illustrating a reading.
Figure 4:
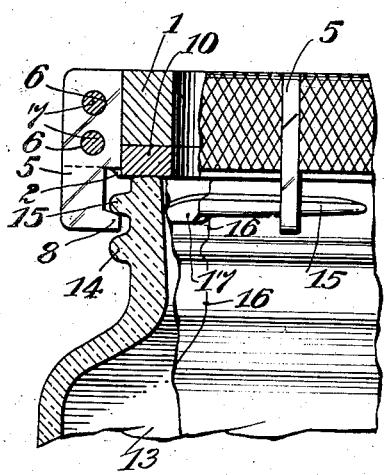
Fig. 4 is a partial sectional view of the gage applied to a container, with the gage in contact with the rim of the container.
Figure 5:
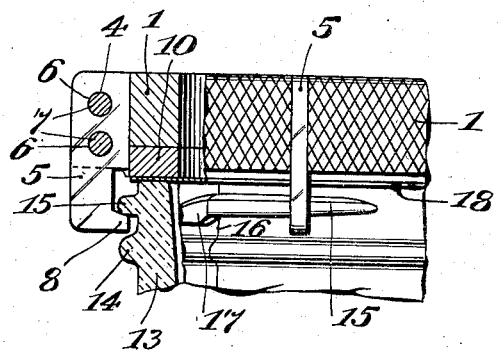
Fig. 5 is a view similar to Fig. 4, with a shim of known thickness inserted between the gage and the container.

As illustrated more particularly in Fig. 3 of the drawing, the lines 11 and 12 on the lower side of the gage are adapted to register with the parting lines 16 of the neck ring when the glass finish is normal. When the glass finish is below normal, that is, when a thread is too low on the container, the members 5 engage the upper end of the thread and cannot move as far as the stop 17 on the thread. The mold mark of the container does not, therefore, reach the line 11 but is on the outside of the two lines 11 and 12, indicating that the finish is above maximum. If the thread is too high up on the neck of the container, the gage proceeds around to the stop and the mold mark passes the lines 11 and 12 and indicates that the thread is below minimum. In some instances, one thread may be higher than another. It is necessary, therefore, to observe whether or not the members grip all of the threads on the container.

In the operation of the device, the gage is applied to the container in substantially the same manner as a cap. The annular ring 10, on the gage, rests against the rim of the container and the members 5 and projections 8 thereon engage the threads 15 of the container just as the lugs on the caps would engage these threads. The gage is, likewise, screwed on in substantially the same manner as a cap would be applied. Naturally, the parts being rigid in construction and the glass being rigid, the gage stops at the same point, irrespective of the turning effort applied thereto. When the gage has been applied, it is merely necessary to note the position of the mold mark 16 with respect to the lines 11 and 12. If the mold mark comes to rest between these lines, the container is within the given tolerances, provided, of course, that the lugs 8 engage the respective threads on the container, which can be readily ascertained by holding the container up to the light. If the mold mark comes to rest outside of the lines 11 and 12, the finish is either above maximum or below minimum. In Fig. 3 of the drawing, the position of the mold line 16 for maximum and minimum is indicated by dot dash lines. The amount that the finish is off standard can be determined because the distance between the lines 11 and 12 represents the tolerance, usually a range of ten one-thousandths of an inch.

The invention also contemplates the provision of a number of circular discs, which are known as shims. These discs 18 are of a definite thickness and are adapted to be inserted between the ring 10 and the rim of the container. Usually, a series of these shims are supplied, varying in thickness from three to ten one-thousandths of an inch; and, in addition, one twenty-five and another fifty one-thousandths of an inch, whereby the desired range may be attained. These shims may be used when the finish of the container is beyond the operative range of the gage, whereby one or more shims may be inserted so that the gage will work upon the finish. The amount that the finish is off will be the reading on the gage in addition to the thickness of the shim. Another important use of the shims is to determine the angle of the thread on the container. By applying the gage to a container without the shim and noting the position of the gage with respect to the container, or noting the position of the member 5 on the thread and thereafter applying the gage with the shim inserted, the position of the member 8 and the reading on the gage will be different. By noting the differences in the readings or noting the difference in the distance which the members 8 move along the thread and knowing the thickness of the shim, the angle of inclination of the thread or the number of threads per inch can be readily calculated. The operation of the gage is the same with the shims as without them, the readings being increased or decreased, depending upon whether they are added or removed.

It will be seen that the present invention provides a device and method for measuring glass finishes, which can be readily used by an unskilled operator and which gives the same reading in all cases. The glass containers may be carefully inspected at the glass factory to avoid the shipment of imperfect ware caused by irregularities of the molds. The accuracy of new molds may be definitely determined, and the inaccuracy if any, may be corrected before a substantial loss has been incurred by the delivery and shipment of imperfect ware. The gage eliminates disputes between the packer, the glass factory and the cap manufacturer by minimizing imperfect ware and, in cases of dispute, by definitely allocating the fault.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. In a measuring device of the class described, the combination of an annular member adapted to engage the rim of a container, said annular member having slots therein, a plurality of members adapted to fit in said slots and to engage the threads on a container, and means for rigidly securing said members in said slots.

2. In a gauging device for determining the accuracy of threads upon a container having a prescribed circumferential relation between the mold mark thereon and the threads, the combination of an annular member of relatively soft metal, an annular ring of relatively hard metal mounted thereon adapted to fit against the rim of a container, and members attached to said annular member adapted to engage the threads on a glass container and position said annular ring against the rim of the container, said device having a marking thereon adapted to register substantially with the mold parting line on the container when said threads are in proper position.

3. In a measuring instrument for glass containers and the like, the combination of means having a surface for engaging the rim of a container, and members secured to said means and accurately positioned with respect to said surface, said members being adapted to engage the threads on the container, and means adapted to be seated on the surface of said first means for changing the effective space between the rim engaging surface and said members to facilitate determining the measurements of the finish of the container.

4. In a measuring instrument for glass containers and the like, the combination of means for engaging the rim of a container, a member for supporting said means, members accurately positioned with respect to said means and connected to said first member, said members being adapted to engage the threads on the container, and means of known thickness adapted to be seated on said first means to facilitate determining the position of the threads of the container.

5. In a measuring instrument for glass containers and the like, the combination of means for engaging the rim of a container, thread engaging members operatively connected to said means for engaging the threads on the container, and means of known thickness adapted to be seated on said first means to facilitate determining the position of the threads on the container.

6. In a measuring instrument for measuring the inclination of threads on a glass container, the combination of annular means adapted to engage the rim of the container, members operatively connected to said means and accurately positioned with respect thereto, said members being adapted to engage the threads of the container, and means adapted to fit upon said annular means to change the effective distance between said annular means and said members, a known amount to facilitate measuring the inclination of the threads on the container.

7. In a gauging device for determining the inclination of threads on glass containers, having a prescribed circumferential relation between a mold parting line thereon and the threads, the combination of means adapted to engage the rim of a container, a member for supporting said means, said member having a marking thereon, members secured to said first member for engaging the threads of the container, and means of known thickness adapted to fit on said first means for changing the effective distance between said first means and said thread engaging members, whereby the inclination of the threads may be calculated by noting the position of marking on said first member with respect to the mold parting line on the container both with and without said means of known thickness.

8. In a measuring device of the class described, the combination of a member adapted to engage the rim of a container, said member having slots therein, members adapted to fit in said slots and to engage the threads of a container, said first member having an aperture leading to each slot, each of said second mentioned members having an aperture registering with the corresponding aperture in said first member, and pins extending through said apertures to secure said members in position.

9. In a gauging device for determining the accuracy of a thread on a container, said thread having a prescribed relationship with the mold parting line on the container, the combination of means adapted to engage the rim of a container and relatively thin metallic members with the inner edge thereof facing the center of the device attached to and accurately positioned on said means and depending therefrom adapted to engage the threads of a container, said device having a marking associated with said means and said members to determine the accuracy in the distance of the finish from the rim of the container by the position of the marking with reference to the mold parting line on the container when said device is screwed thereupon.

10. In a gauging device of the class described, the combination of a member adapted to engage the rim of a container, said member having slots therein, and a plurality of members rigidly secured in said slots.

11. In a gauging device for determining the accuracy of lug threads upon a container having a prescribed circumferential relation between the mold mark thereon and the lug threads, the combination of means having members thereon adapted to engage and be screwed upon said threads, said means having a pair of spaced markings thereon adapted to assume a position relative to the mold parting line on the container when said members are screwed upon the threads of the container, said relative position of said markings with respect to the mold parting line indicating the accuracy of the threads whereby the distance between the bottom of the glass thread and the rim of the container is shown to be within the permissible range of tolerances when the mold parting line is between said pair of markings.

12. In a gauging device of the class described, the combination of an annular member of relatively soft metal, an annular ring of relatively hard metal mounted on the lower side of said annular member, said ring being adapted to engage the rim of a container, and depending metallic members attached to said annular member having means thereon extending from said annular member an accurately gauged distance for engaging the threads on a glass container, said depending metallic members being relatively thin with one edge facing the center of the annular member and with one end depending below the annular member with accurately machined inwardly extending projections adapted to engage the bottom of the threads.

13. In a gauging device for determining the accuracy of lug threads upon a container having a prescribed circumferential relation between a mark thereon and the lug threads, the combination of a member adapted to engage the rim of a container, and a plurality of members rigidly attached to said rim engaging member adapted to engage the threads on the container, said rim engaging member having circumferentially spaced markings associated therewith to indicate the accuracy of the glass finish by the position of said markings with respect to a marking on the container when said thread engaging members are applied upon said threads, whereby the distance between the bottom of the glass thread and the rim of the container is shown to be within the permissible range of tolerances.

LOUIS A. VON TILL.